Figure 1:
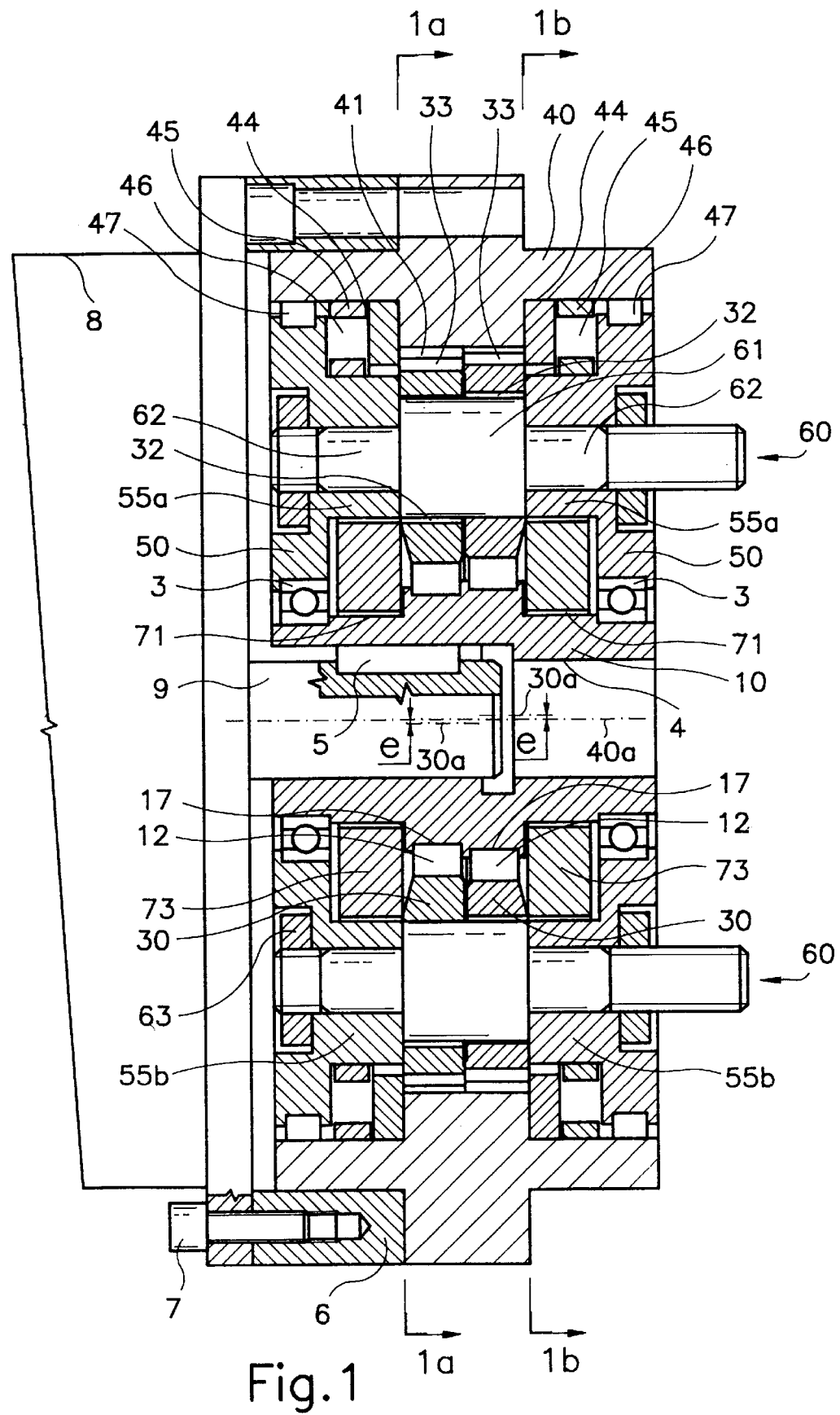

United States Patent [19]
Janek

[11] Patent Number: 5,908,372
[45] Date of Patent: Jun. 1, 1999

[54] GEAR SYSTEM

[75] Inventor: Bartolomej Janek, Presov, Slovakia

[73] Assignee: Spinea S.R.O., Kosice, Slovakia

[21] Appl. No.: 08/601,020

[22] PCT Filed: Feb. 13, 1985

[86] PCT No.: PCT/IB95/00097

§ 371 Date: Feb. 16, 1996

§ 102(e) Date: Feb. 16, 1996

[87] PCT Pub. No.: WO95/22017

PCT Pub. Date: Aug. 17, 1995

[30]     Foreign Application Priority Data

Feb. 14, 1994 [SK] Slovakia .................................... 174-94

[51] Int. Cl.⁶ ....................................................... F16H 1/52
[52] U.S. Cl. ........................................... 477/162; 475/168
[58] Field of Search ..................................... 475/162, 168, 475/174, 180

[56]         References Cited

U.S. PATENT DOCUMENTS

| | | | |
|---|---|---|---|
| 3,979,167 | 9/1976 | Grove | 475/168 X |
| 4,271,726 | 6/1981 | Ryffel | 475/168 X |
| 4,846,018 | 7/1989 | Matsumoto . | |
| 5,468,193 | 11/1995 | Yamaguchi | 475/162 |

FOREIGN PATENT DOCUMENTS

| | | | |
|---|---|---|---|
| 211687 | 2/1987 | European Pat. Off. | 475/162 |
| 990493 | 9/1951 | France . | |
| 2050828 | 4/1971 | France | F16H 3/00 |
| 2320469 | 3/1977 | France | F16H 1/32 |
| 2835973 | 2/1980 | Germany | F16H 25/04 |

*Primary Examiner*—Khoi Q. Ta
*Attorney, Agent, or Firm*—Horst M. Kasper

[57]            ABSTRACT

The invention relates to a gear system with at least one wheel (40) with an internal toothing (41), with at least one output member (50) mounted to rotate with respect to the wheel (40), and with an input shaft (10) with at least one eccentric portion (17) on which there is rotatably mounted at least one wheel (30) with external toothing (33) meshing with the internal toothing (41), when there are two or more wheels (30, 30) at least one wheel (30) being located between the output members (50, 50). Between the wheel (30) and the output member (50) there is located a member (70) transforming the planetary movement of the wheel (30) into rotary movements of the output member (50), said wheel (70) being located to be displaceable with respect to the wheel (30) and the output member (50), and executing transverse movements (FIG. 2e) with respect to the axis of the input shaft (10).

30 Claims, 14 Drawing Sheets

GEAR SYSTEM

The invention relates to a gear system in accordance with the preamble to claim 1.

Such gear systems are used in particular at transmission ratios in the range of 1:6 to 1:250 with a large specific load-carrying capacity in relation to the weight and the external dimensions of the gear system. Previous gear systems with high transmission ratios are known and are for example described in U.S. Pat. No. 4,846,018. In this gear system the reduction mechanism comprises a primary and a secondary reduction stages. The primary stage comprises a central pinion and a plurality of satellite wheels with toothing on the outer circumference. The secondary stage comprises a system of crankshafts whose external portions carry rotarily mounted gear wheel tracks with an external toothing, which mesh with the internal toothing of the wheel. The crankshafts are mounted at their ends in flanges, which are connectable together in a non-rotary fashion. The central pinion operates in conjunction with the satellite wheels of the primary stage, which are located at the ends of the input crankshaft. A substantial disadvantage of this gear system resides in the low specific torque capacity which is limited by the power transmission of the bearings of the input crankshafts. Moreover, the dimensions of the roller bearings of the crankshafts are so selected that small gear systems of the order of magnitude of 50 to 100 mm cannot be manufactured without difficulty. These roller bearings also restrict the specific torque capacity of the gear system. There is further disclosed in DE 28 35 973 a further gear system which also comprises a central input shaft upon the eccentric portions of which are located rotarily mounted satellite wheels with an external toothing. These gear wheels mesh with a wheel with an internal toothing. The satellite wheels are provided with continuous axial openings. In order to avoid sliding friction in the line contact range between the pins and the satellite wheels, there are located on the pins bushes which, however, do not remove the actual sliding friction and the problems involved therewith. Due to the sliding friction and the resultant lost heat, the rated speed of the gear system is chronologically limited. This friction wears the contact surfaces and increases inaccuracies in the reduction mechanism of the gear system, which is particularly undesirable when high precision of the gear system is required. Therefore, in the known case, efforts are made to obtain a high degree of manufacturing precision of the individual components.

Proceeding from the above prior art, the purpose underlying the invention is to provide assistance here.

The purpose set is fulfilled according to the invention by the features of claim 1.

The proposed gear system comprises at least one wheel with an inner toothing (internal geared wheel), and regularly two circular and disc shaped flanges, which are rotatably mounted in relation to this wheel. The gear system has an input shaft with eccentric portions which are offset to one another by approximately 180°. Rotarily mounted on these portions are wheels with an external toothing (planet wheel). The axes of the eccentric portions are offset in relation to the axis of the input shaft by the same amount (eccentricity). The wheels with external toothing mesh with the wheel with internal toothing and they are located between the output members (flanges). In many cases it is appropriate if the output members are not-rotatable relative to one another. In this case the wheels having an external toothing are provided with axial openings through which there are passed connecting elements, without contact in relation to the wheels. In this case the output members are connected so as to be releasable from one another but yet non-rotatable. Apart from this non-rotatable connection of the output members, the connecting members can also define the relative axial position of the output members. The wheels with external toothing have such a degree of freedom that they can execute orbital movements (planetary movements). These wheels can therefore execute rotary movements about the axis of the wheel with inner toothing (internal geared wheel) with simultaneous rotation about their own axis. In the proposed gear system there is located between the respective wheel with external toothing and the associated output member (flange) an appropriate member, which transforms the orbital movement of the wheel with external toothing into rotary movements of the output member about its own axis. This member is movably located relative to the wheel with external toothing and also relative to the output member. The said member simultaneously executes transverse movements in relation to the axis of the input shaft (crankshaft). Each output member is provided with guide tracks, defining a linear guidance of the transforming member. These guide means for the flanges are aligned in the same direction and transversely to the axis of rotation of the output member. Simultaneously, each wheel is fitted with guide tracks which define a linear guidance for the transverse movements of the transforming member. These guide means are aligned transversely to the wheel axis. The transforming member (unit) has two couples of guide tracks located preferably at right angles to one another or similarly aligned, so that in this way the transforming member is movably and linearly guided, both in relation to the output member and in relation to the associated wheel. At least two output members of the gear system which in a specific embodiment form a pair, and at least one transforming member which is associated with at least one of these output members, are provided with central openings, so that the input shaft is passed through the central openings in the output member, and simultaneously passes without contact through the central opening of the associated transforming member.

The guide tracks for the linear guidance system are designed to be in or on the output member, at the sides facing one another of the projections which are formed relative to the central axis of the output member by axially symmetrical pairs located on the axial end faces of the flanges. The axial projections (stop means) have, seen in axial plan, the shape of arcuate trapezoids. There are formed in these stop means axial openings (holes). The guide tracks for the linear guidance system on the wheel with external toothing are respectively defined by two sides lying opposite one another of the stop means of the wheel. On the one hand the guide tracks may be formed directly on the stop means (projections) of the wheel and of the output member. On the other hand they may also be formed by flat strips, which are secured on the sides facing one another of the stop means of the wheel and of the output member. The transforming member is preferably formed by four arms/legs, which respectively define two pairs, lying opposite one another, and carried by a ring-like portion of the transforming member. One pair of oppositely-lying arms defines the first couple of guide tracks by means of which the transforming member is movably located in a linear guidance system of the output member, and the second pair of arms/legs forms the second guide track (portion) by means of which the transforming member is located movably in the linear guidance system. This linear guidance is formed in or on the wheel with the external toothing. Between the guidance tracks of the linear guidance which are formed on the output member, and the guide tracks of the transforming member, there are located roller elements, e.g. cylinders. In cases where the individual portions of the gear system may be located relative to one another with a degree of play, the guide tracks on the flange and on the wheel with external toothing may be designed in the form of guidance or sliding surfaces. Sliding layers, formed from material with good sliding properties, increase the degree of efficiency of the transmission. Connecting members by means of which the flanges may be connected together, pass through the axial openings in the stop means. The axial position (spacing) of the flanges to one another is defined by spacer members. Except for the case where the connecting member and the spacing member are integrated and form one single part, the spacing members are either formed directly on the stops of the flange, or they form a separate portion of the gear system, being provided with axial openings through which pass the connecting members. The internal toothing may be formed from elements with a circular cross section, e.g. cylinders, which are located on the internal circumference and in recesses in the wheel with the internal toothing (internal geared wheel), distributed regularly about the axis. The external toothing may likewise be formed from elements with a circular cross-section, e.g. by cylinders, which are located in recesses/niches, the recesses being uniformly distributed on the external circumference of the wheel. The co-operation between the wheel with external toothing and the wheel with internal toothing may be advantageously embodied in two entrainment areas, which are symmetrical in relation to a plane defined by the axes of both wheels.

Entrainment of the wheels with cylindrical toothing in two entrainment ranges may be effected by initial tension, marked linearisation of the characteristic of the wheels being achieved. This initial tension is rendered possible by contact elasticity of the cylindrical teeth. At least one flange is rotatably mounted in the casing (wheel with internal toothing). There may be formed on the external circumference of the flanges and on their end faces which face the transforming member, radial and axial rotating bearing tracks. In the same way, the wheel with internal toothing may be provided on its internal circumference with bearing members with rotating tracks, which can serve to provide a bearing for the flanges in the casing (internal geared wheel). In this case axial bearing tracks may be located on the end faces which face the associated flange. Between the radial and the axial rotating tracks of the flange and of the wheel with internal toothing there are located roller members. Two securely connected flanges and the wheel with internal toothing in this way form a radial-axial-bearing with high strength and power-absorbing capacity. Furthermore, the flange pair is mounted relative to the wheel with internal toothing in such a way that there is securely connected to this wheel a member in which a driven element is rotatably mounted. This member is connected to the flange pair. The driven unit may for example be the output shaft whose flange portion may be securely connected to the flanges (output members). The input shaft may be mounted in the central opening of one or the other of the two flanges by means of a bearing.

Securely connected to the input shaft of the gear system is an entrainment means with axial eccentric portions. The axial eccentric portions are uniformly located on the end face of the entrainment means in a circular configuration. The eccentric portions carry rotatably mounted satellite gear wheels with an external toothing. These satellite gear wheels mesh with the internal toothing formed on the flange, simultaneously meshing with the external toothing of the input pinion.

The substance of the gear system with an eccentric portion comprises the following:

The gear system comprises a wheel with internal toothing (internal geared wheel) and a flange. The flange is mounted rotatably with respect to the wheel with internal toothing. The gear system has an input shaft with at least one eccentric portion (eccentric), upon which a wheel with external toothing is rotatably mounted. This wheel meshes with the wheel with internal toothing. The wheel with external toothing has a degree of freedom for executing orbital movements (planetary movements), i.e. it can execute rotary movements about the axis of the wheel with internal toothing while simultaneously rotating about its own axis. The gear system with an eccentric is characterised in that there is located between the wheel with external toothing and the flange an appropriate transforming member, which transforms the orbital movement of the wheel with external toothing into rotary movements of the flange about its own axis and if necessary that of the internal geared wheel. The transforming member (unit) is movably mounted both with respect to the wheel with external toothing and also with respect to the flange, simultaneously executing transverse movements relative to the axis of the input shaft.

The advantages achieved by the invention may be summarised as follows:

a) The bearings of the input shaft are stressed exclusively by forces which arise in the meshing region of the teeth. In this way a high specific torque capacity of the gear system is achieved. Force reactions due to the load torque which arises on the oppositely-lying arms of the transforming member, are mutually removed, and they are transmitted into the bearings of the input shaft not as a force load. In other words, the transforming member transmits only the torque and generates no force reactions. In this way the torque capacity of the gear system is increased by approximately 50% in comparison to previous systems or gear arrangements.

b) Reduction mechanism without sliding friction gives rise to maximum degree of efficiency. Roller elements which are located between the guide tracks of the flange and the guide tracks of the transforming member and between the guide tracks of the wheel with external toothing and the guide tracks of the transforming member, form linear rolling guidance systems for the transforming member during its relative displacement movements relative to the flange and the wheel with external toothing. In the proposed reduction mechanism, therefore, only rolling friction comes into effect, thus achieving a maximum possible degree of efficient performance. The magnitude of the amplitude of the displacement speed during oscillatory movements of the transforming member is as a rule $10^{-1}$ m/s. This value of the linear speed of the roller elements, located between the guide tracks of the flange and the guide tracks of the transforming member and between the guide tracks of the wheel with external toothing and the guide tracks of the transforming member, is about 100 times lower than the linear speed of the roller elements of the rotary bearings, so that the loss performance of the reduction member in the gear system proposed is correspondingly reduced. For this reason the gear system can operate at a clearly higher rated speed than and previous gear systems, whose reduction mechanism uses rotary sliding bearings and roller bearings. In this comparison, the same temperature-work regimes are taken into account.

c) A preloaded reduction mechanism has highly linearized torsion characteristics in the range of zero load torque, and high running precision of the gear system.

The roller elements in the guidance for the transforming body, which executes relative displacement movements with respect to the flange and the wheel, form a resilient system enabling initial tension of the bearing provision of the transforming member in the linear guidance, formed in the flange and in the wheel with external toothing. This initial tension is not accompanied by an increase in passive resistances or a fluctuation at the output of the gear system. The purpose of initial tension of the roller guidance of the transforming member is to achieve a linear characteristic of the torsion stability in the gear system in the zero range of the torque load. The initial tension eliminates the lost motion in the gear system, which causes difficulties in the case of precise servo-guidance systems.

d) The transforming member does not occupy the radial construction space between the input shaft and the external toothing of the wheel, so that extremely small gear systems may be manufactured. Extreme dimensions of the gear system in the range of 60 mm or less are easily produced in comparison to previous gear systems.

e) The gear system integrates two functions: The function of the gear system as such, and that of the bearing.

The external bearing tracks, which are formed directly in the flange and in the wheel with internal toothing, also fulfill a second function within the gear system, i.e. the function of a radial bearing, which transmits forces and power torques in all directions. The free radial space above the transforming member is advantageously utilized for location of the axial roller bearing. Such a gear system may be directly used as a rotary table for various devices or as a joint of a robot.

f) Dynamic balance of the gear system construction:

In the case of gear systems with two eccentric portions which are offset to one another and about the same axis by 180°, the transforming members execute harmonic oscillating movements in the counter phase, their force effects mutually cancelling one another, and not being transmitted to the environment in which the gear system is installed.

g) The use of gear wheels consisting of cylinders permits initial tension of the meshing sub-system. The initial tension in the range of the entrainment means of the cylindrical teeth involves the same effects as the initial tension of the reduction mechanism, due to which the gear system as a whole achieves a high degree of linearity of torsional stability, even in the zero range of torque load.

h) The advantage of flanges and wheels with external toothing: The guide tracks on the flange and on the wheel with external toothing are uniformly worn, which is advantageous in relation to planetary gears of the previous systems.

Figure 1A:
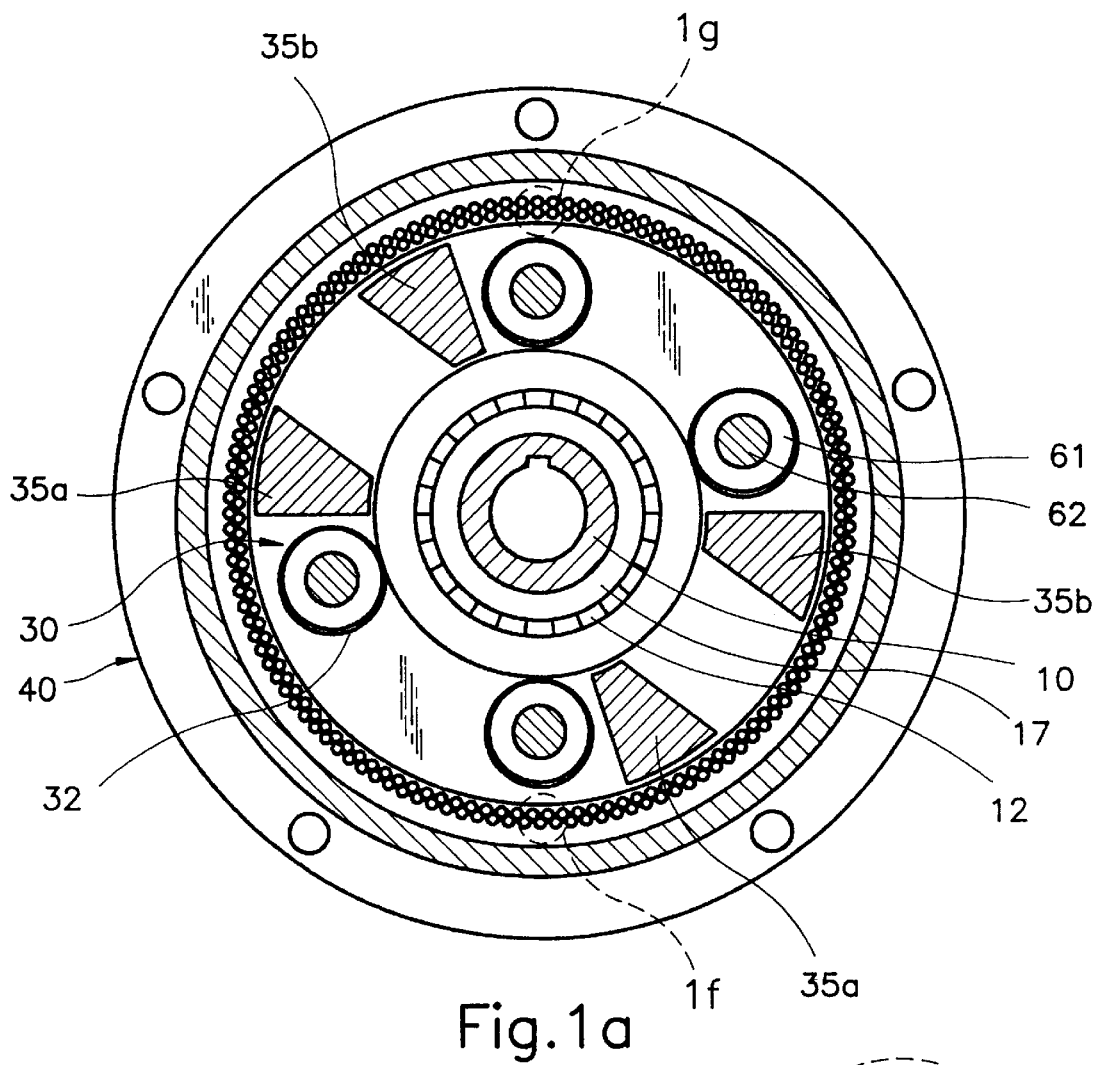
Figure 1F:
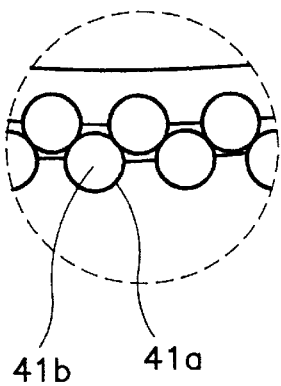
Figure 1G:
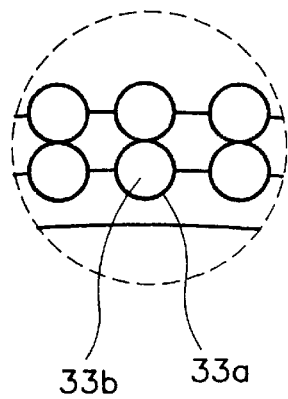
Figure 1C:
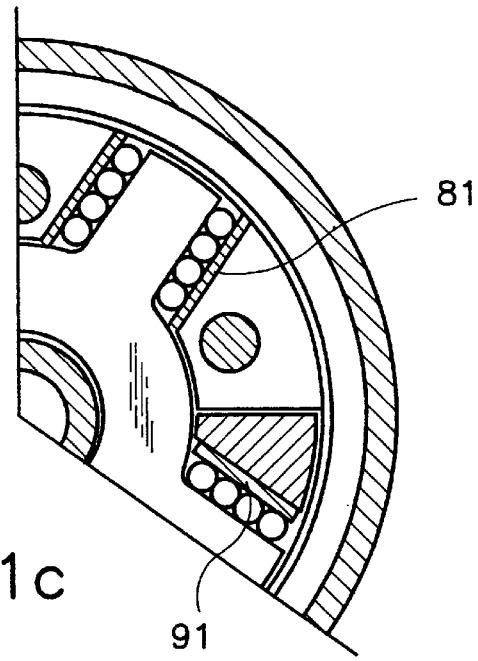
Figure 1B:
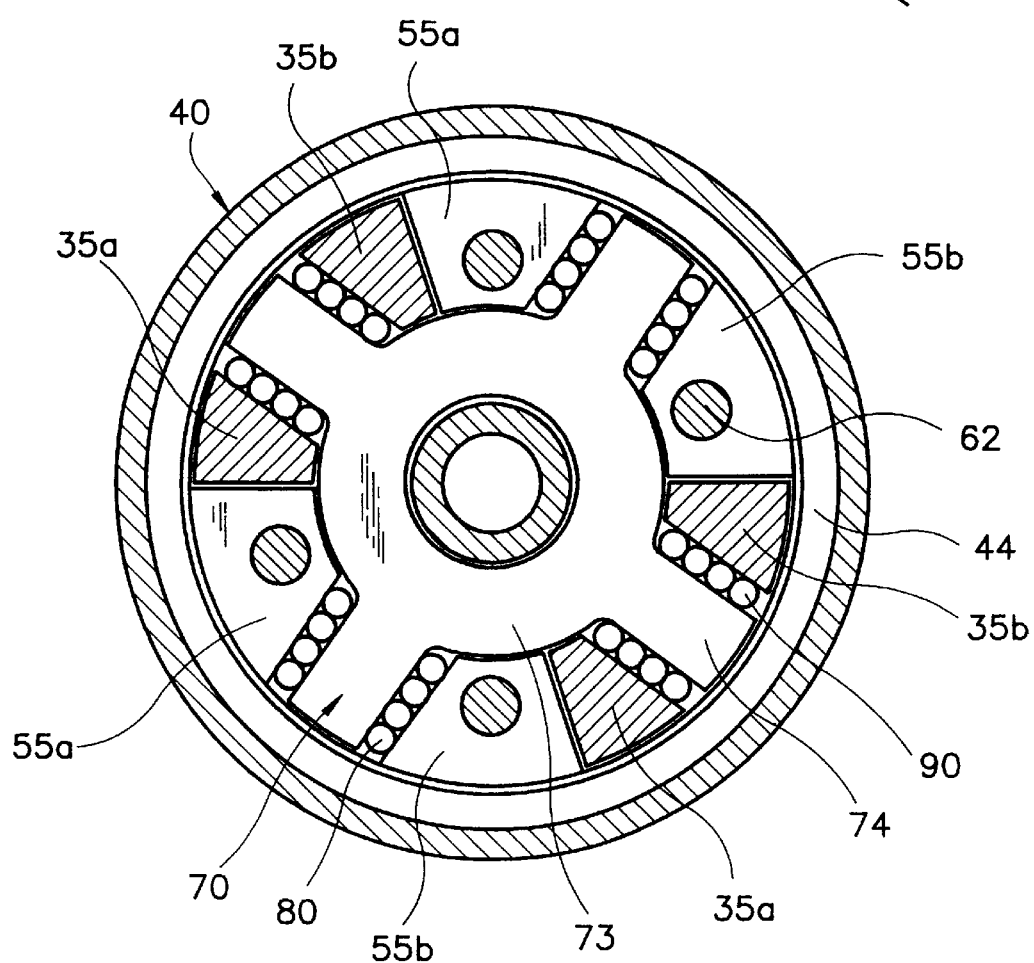
Figure 1D:
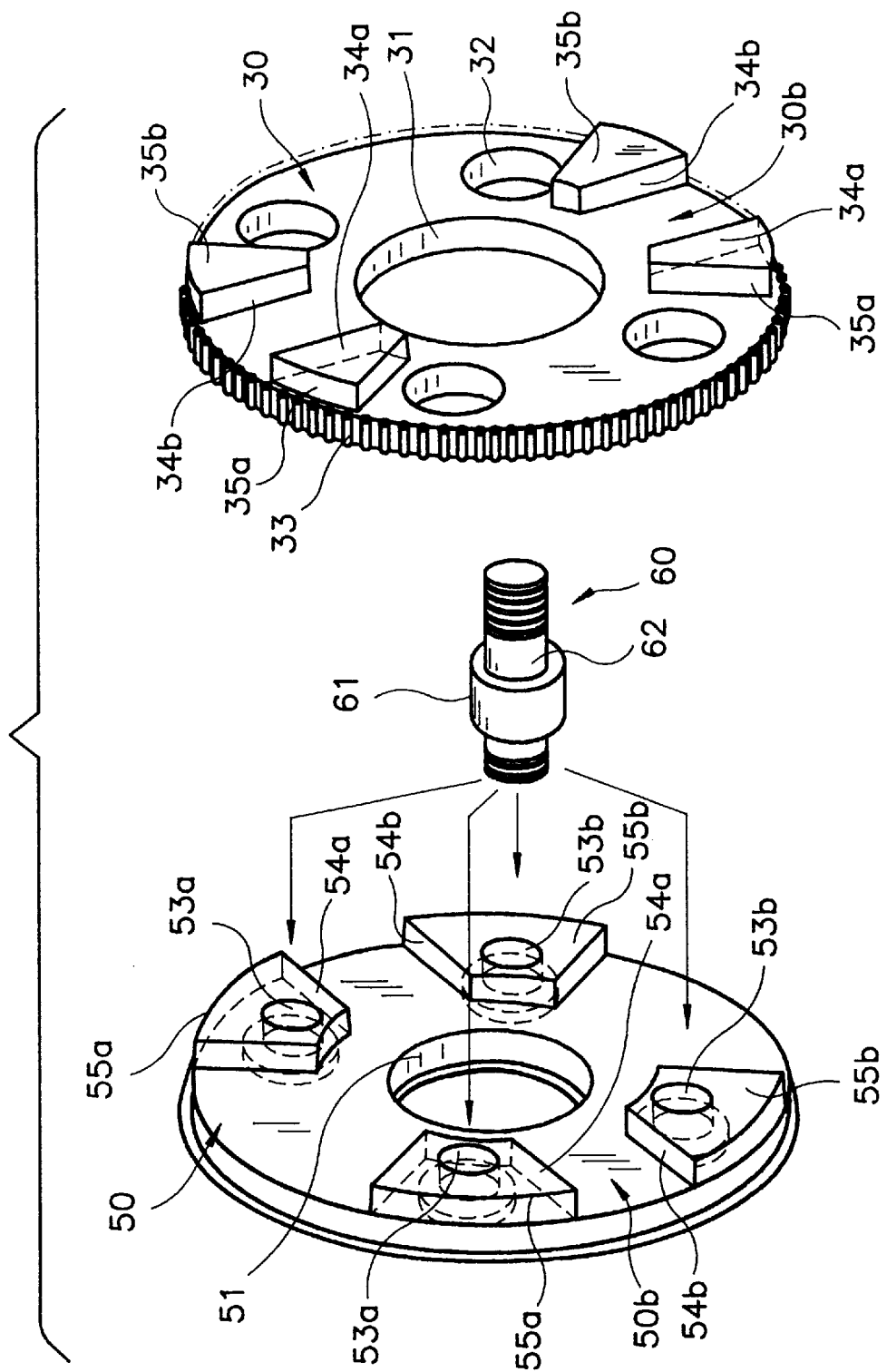
Figure 1E:
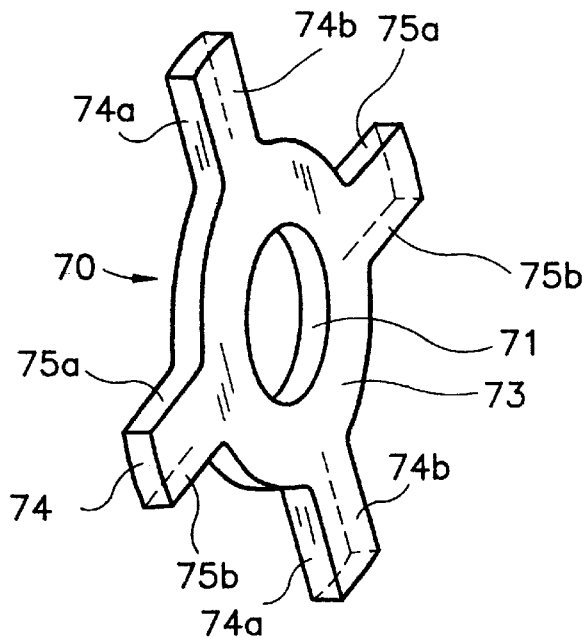

Some embodiments of the invention given by way of example are shown schematically in the drawing, and will be explained in more detail in the following. Shown are:

FIG. 1: a gear system in cross-section, the flanges being connected by connecting means;

FIG. 1a: a cross-section along line 1a—1a according to FIG. 1;

FIG. 1b: a cross-section along line 1b—1b according to FIG. 1;

FIG. 1c: an arrangement of strips with guide tracks at stop means;

FIG. 1d: an exploded view of a flange, a wheel and a connecting member according to FIG. 1;

FIG. 1e: a perspective side elevation of a transforming member;

FIG. 1f: a partial view according to FIG. 1a;

FIG. 1g: a partial view according to FIG. 1a.

Figures 2D, 2F:
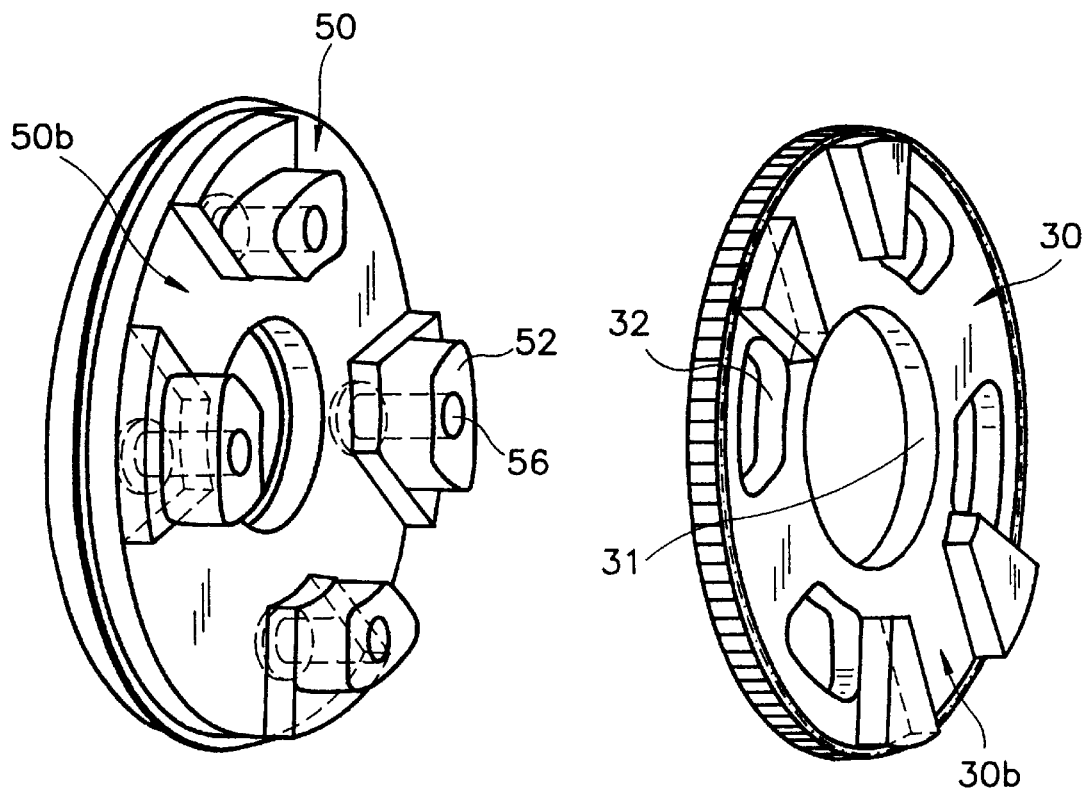
Figure 2:
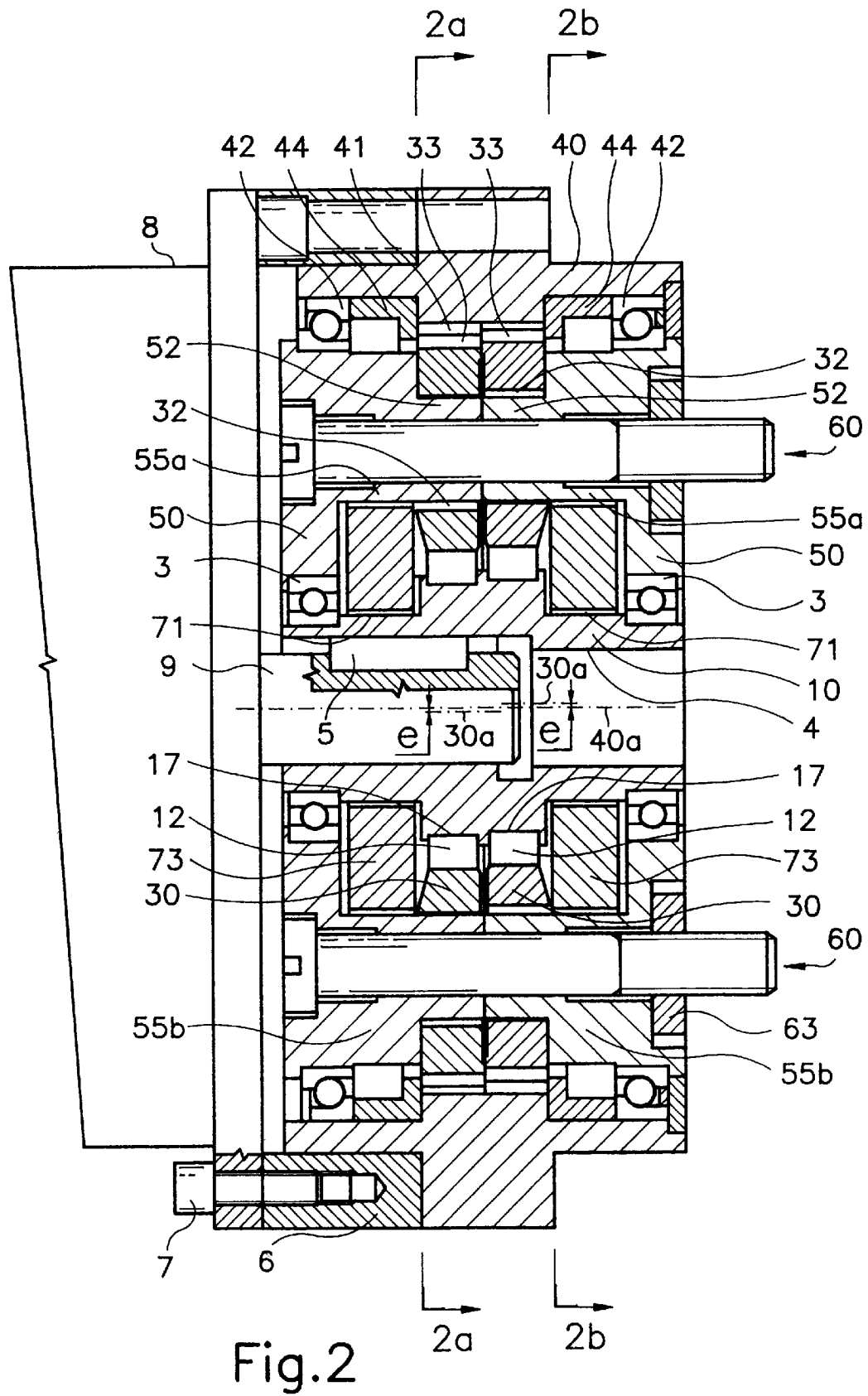
Figure 2A:
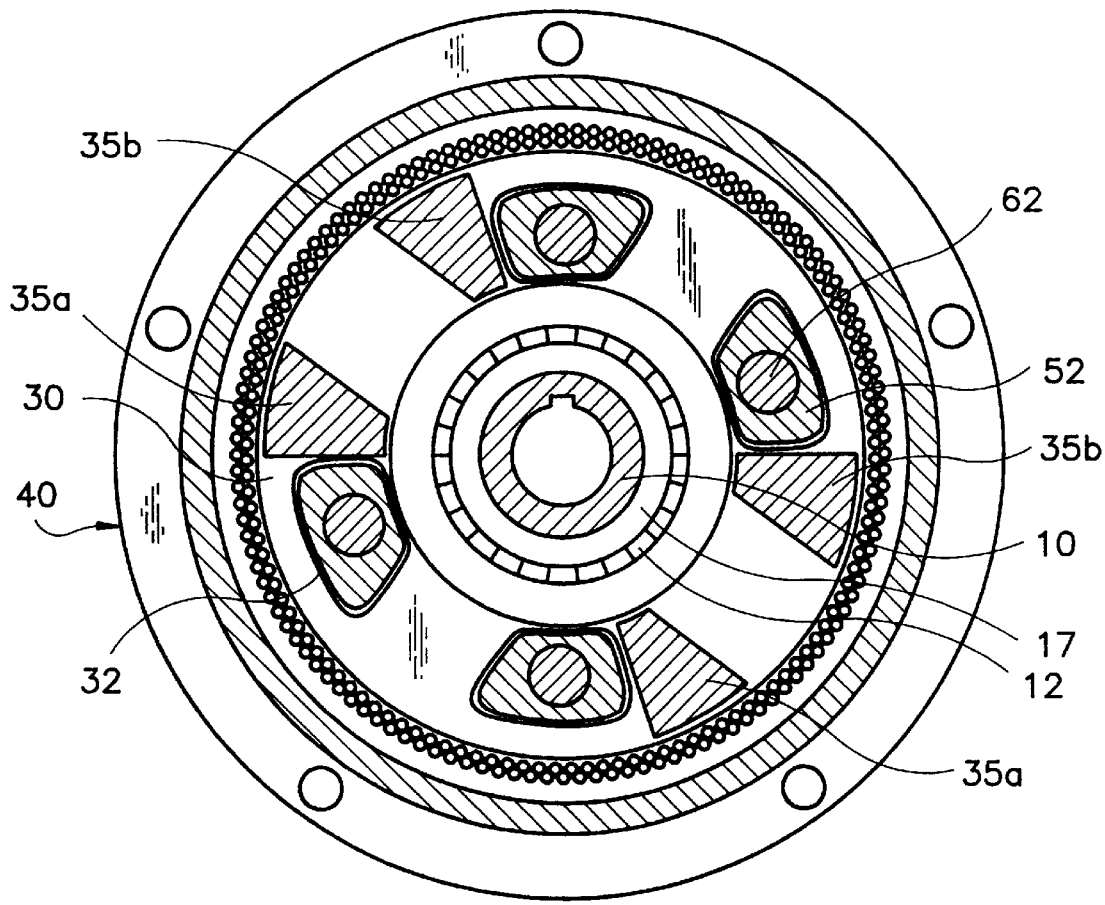
Figure 2C:
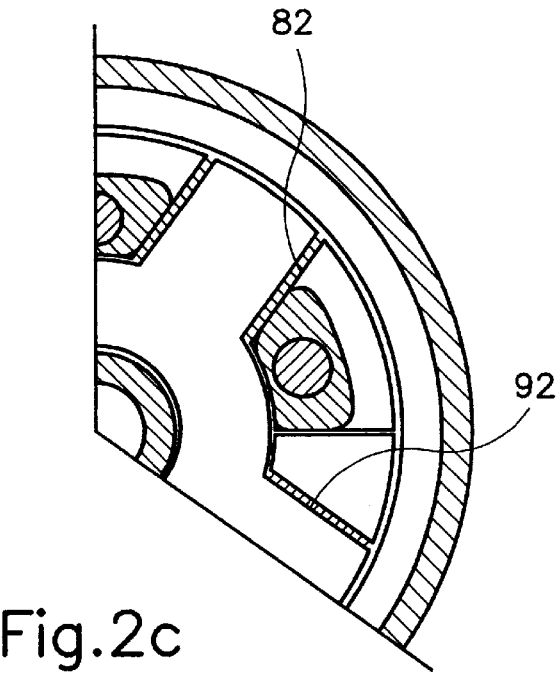
Figure 2B:
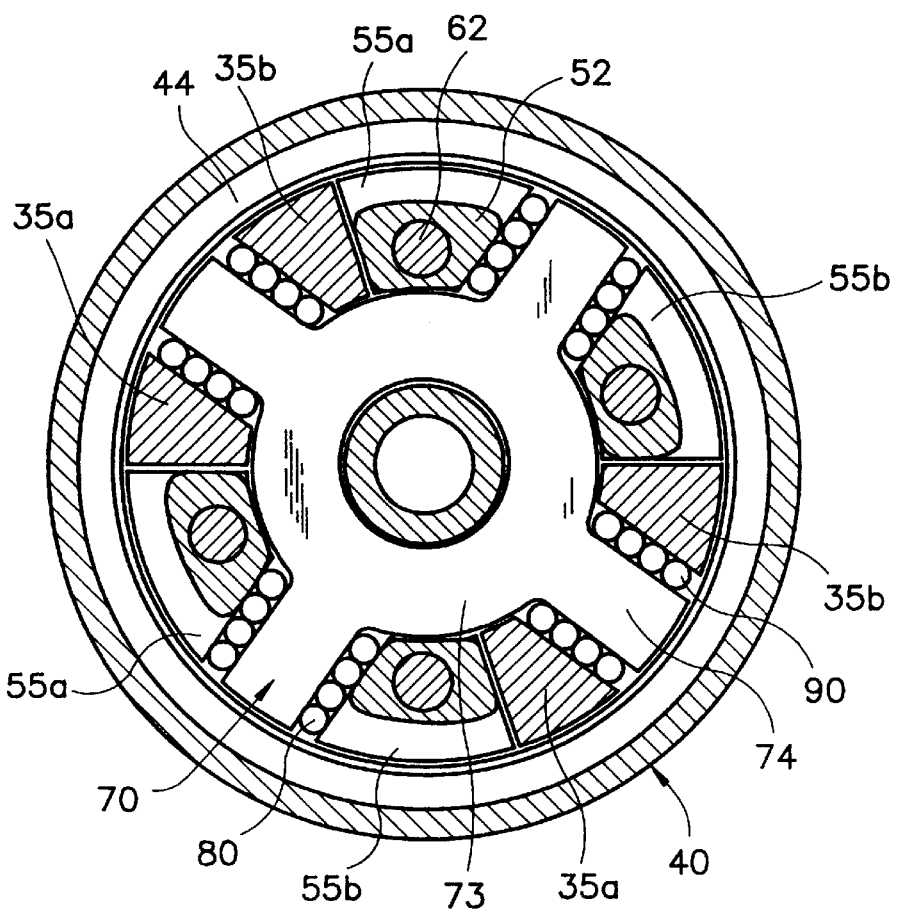
Figure 2E:
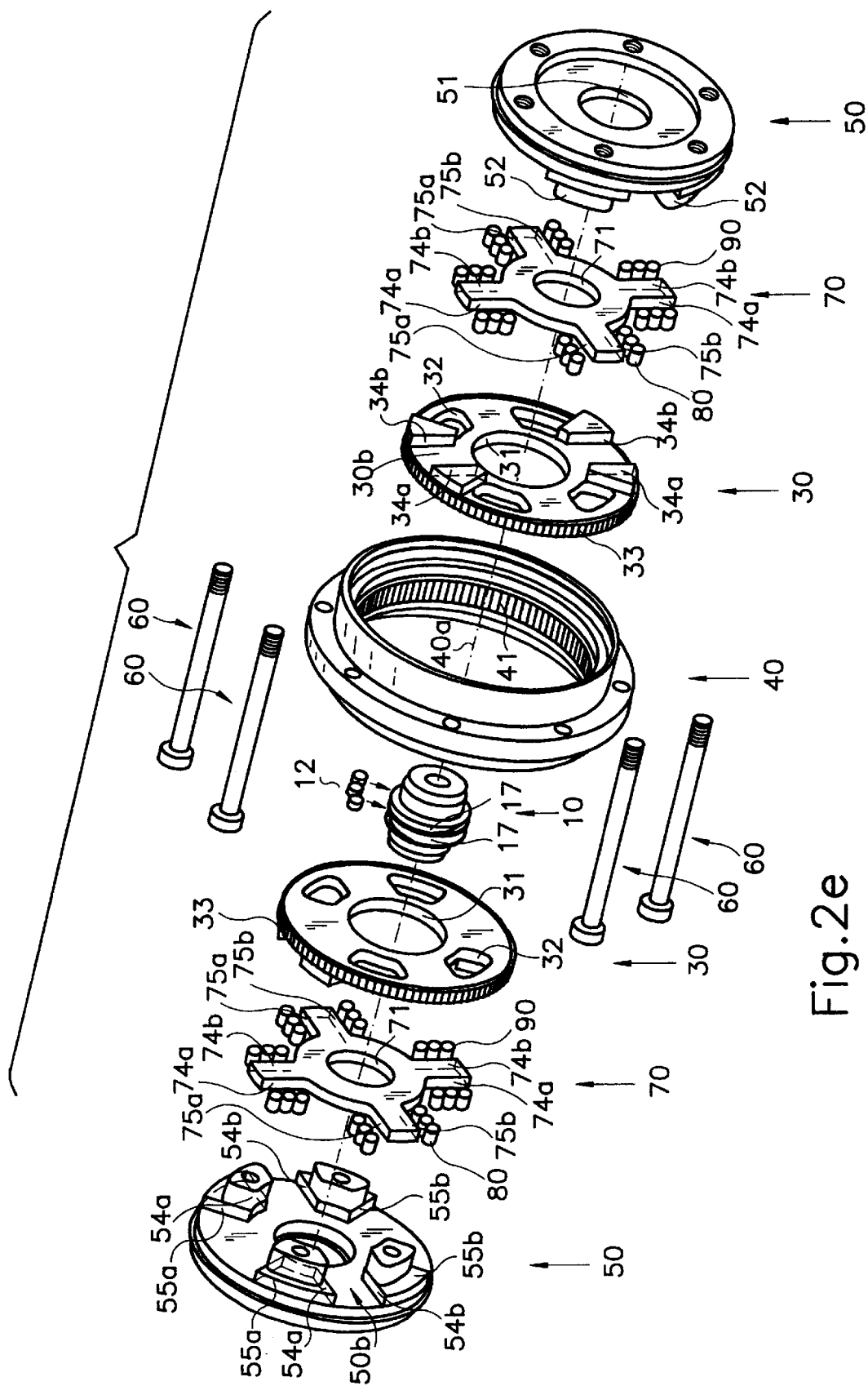
Figure 3:
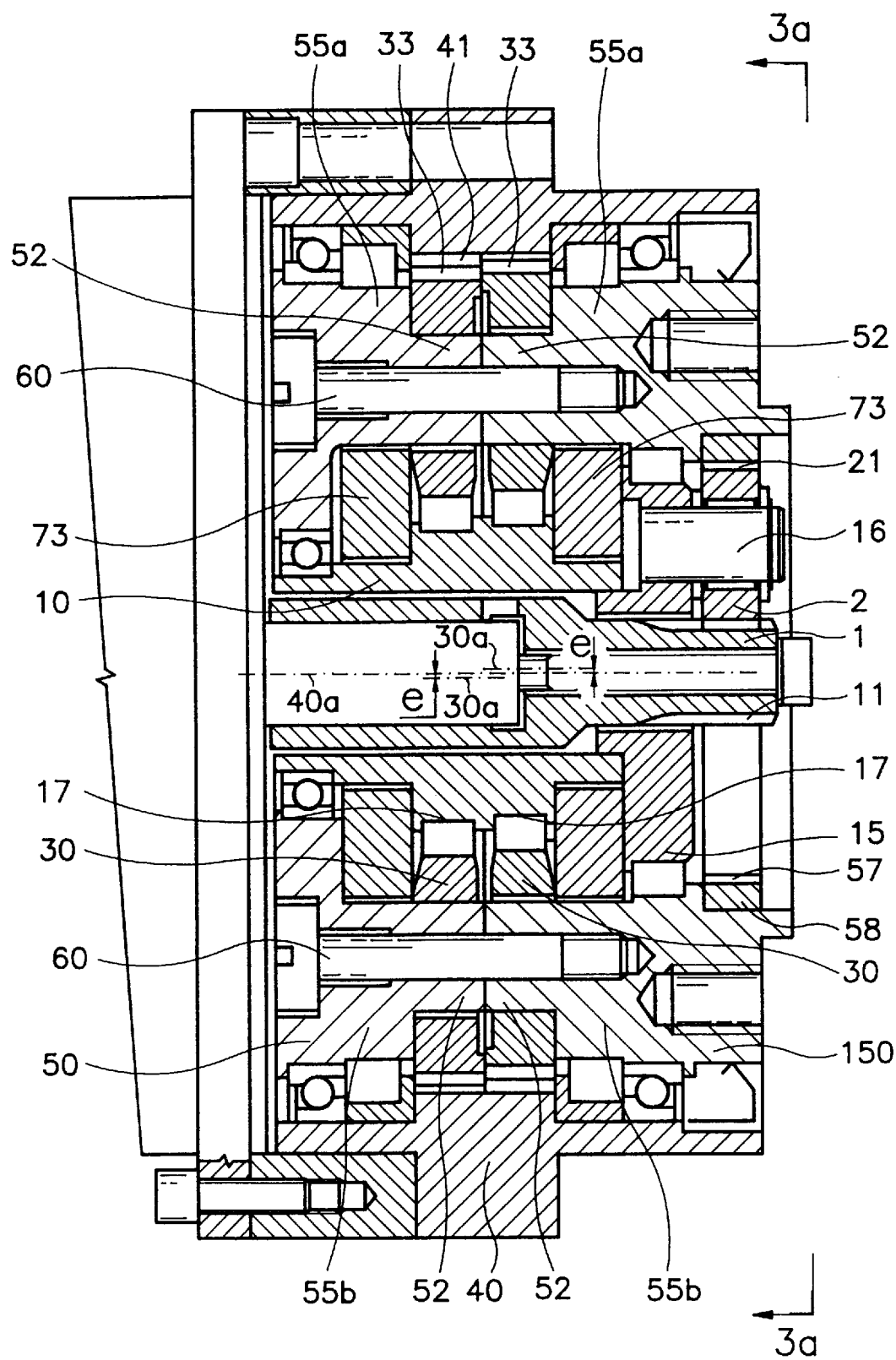
Figure 3A:
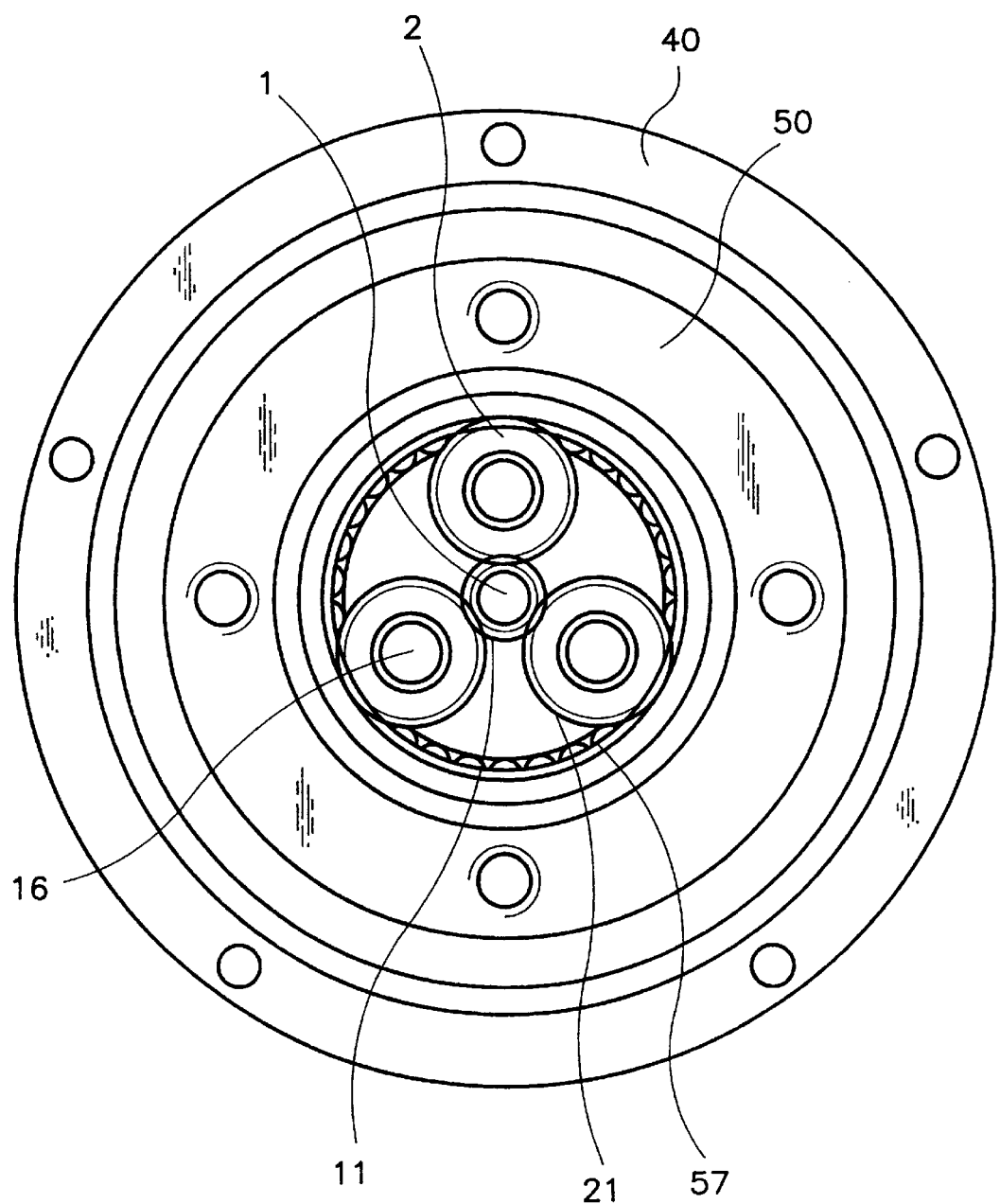
Figure 4:
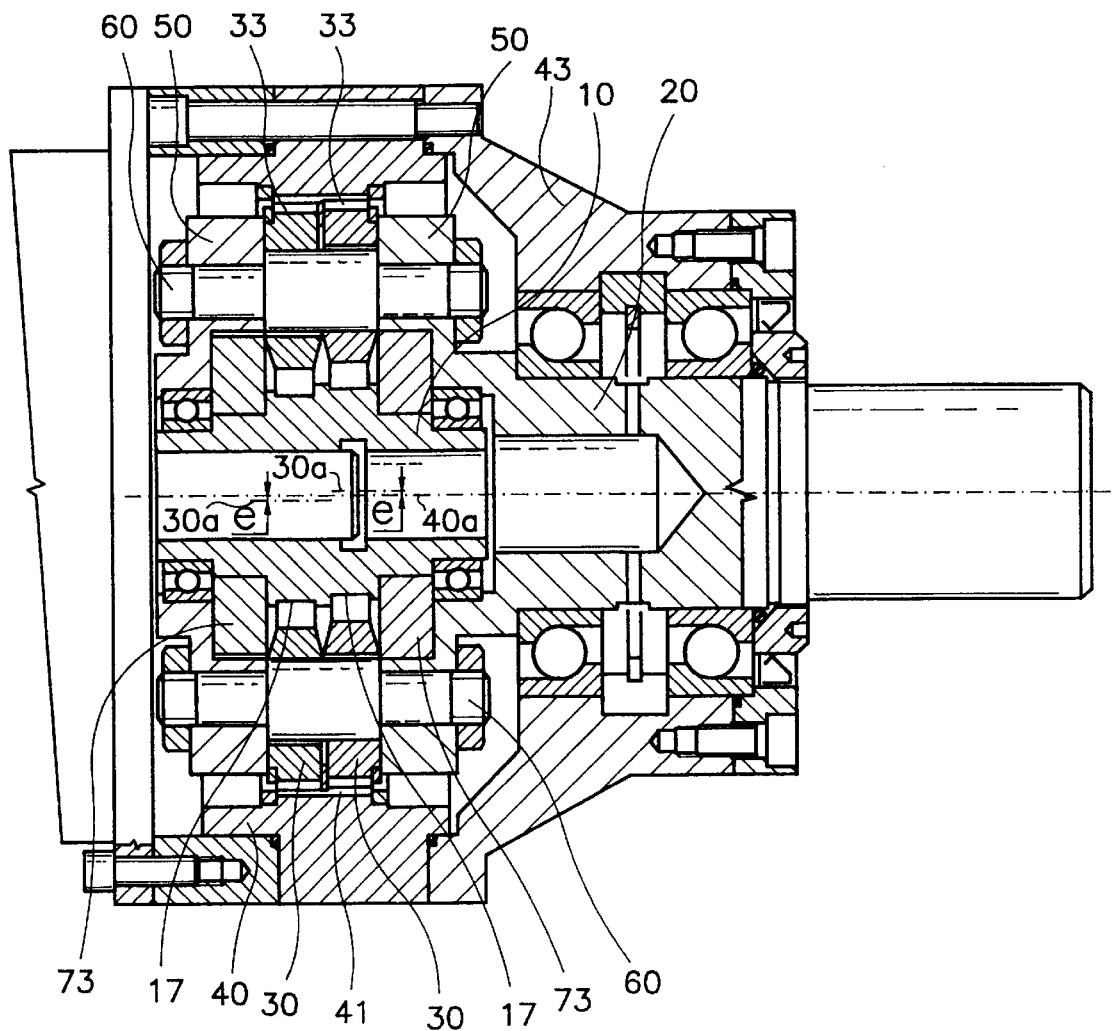
Figure 5:
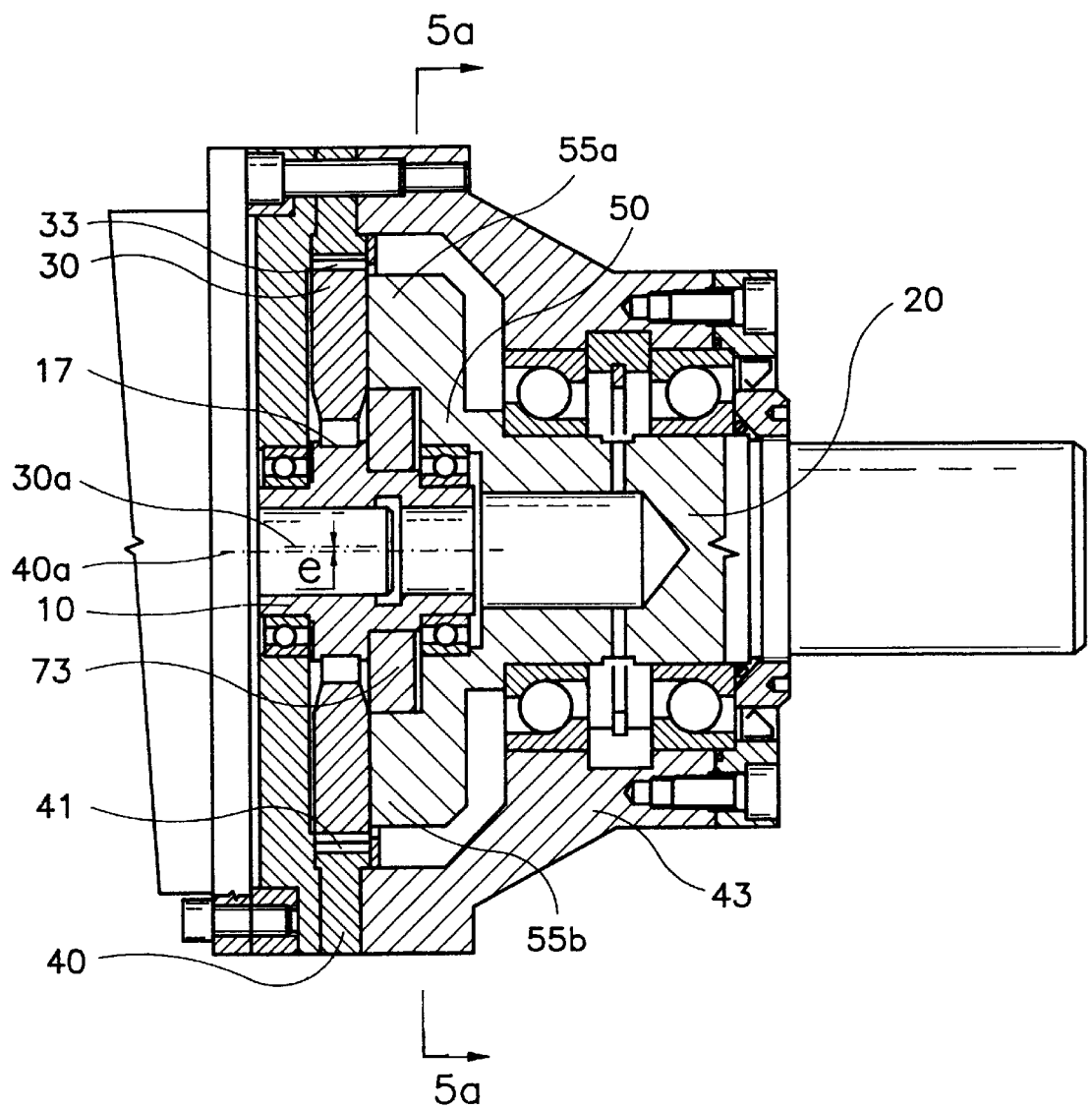

FIG. 2: a second embodiment of the gear system, the flanges being interconnected by connecting members, which are passed through axial openings in the spacing members;

FIG. 2a: a cross-section along line 2a—2a according to FIG. 2;

FIG. 2b: a cross-section along line 2b—2b according to FIG. 2;

FIG. 2c: an arrangement of the transforming member in a linear sliding guidance system formed on the wheel with external toothing and on the flange, the sliding layers being formed on the stop means of the wheel and of the flange;

FIG. 2d: a perspective side elevation of a flange according to FIG. 2;

FIG. 2e: an exploded view of the gear system shown in FIG. 2;

FIG. 2f: a wheel with external toothing according to FIG. 2;

FIG. 3: a gear system with a preliminary gear arrangement;

FIG. 3a: an axial view of a section of the preliminary gear according to FIG. 3;

FIG. 4: a further gear system with two flanges interconnected by a driven unit, which is rotarily mounted in a member securely connected to the wheel with internal toothing;

FIG. 5: a gear system with an eccentric portion and a transforming member, and

Figure 5A:
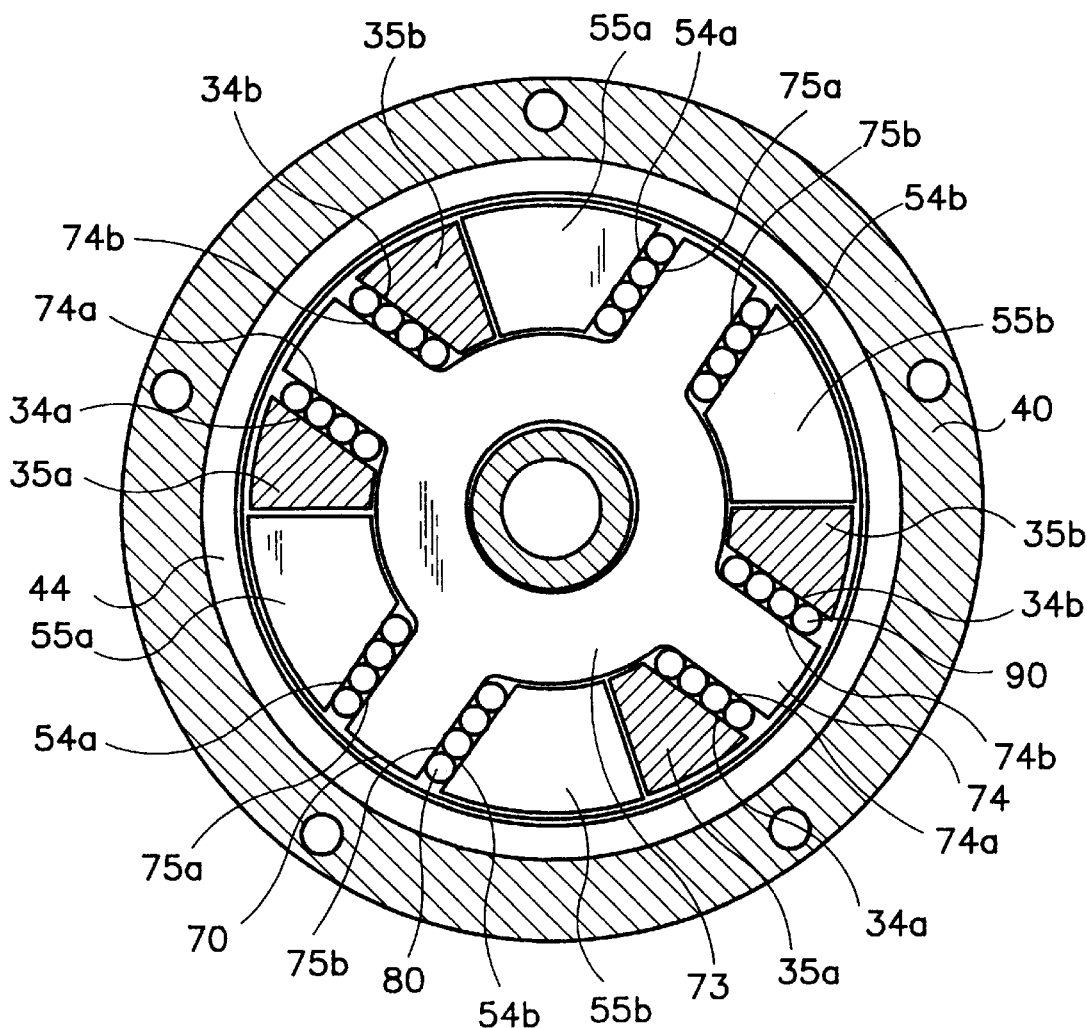

FIG. 5a: a cross-section along line 5a—5a according to FIG. 5.

The first gear system with a cross-reduction mechanism is shown in FIGS. 1, 1a, 1b, 1c, 1d and 1e. The input shaft 10 has two eccentric portions 17 which are rotated through 180 degrees. The eccentric portions 17 carry rotatably mounted wheels 30 with external toothings 33 and central openings 31. The wheels 30 have a plurality of continuous axial openings 32, which are uniformly distributed about the axis of the wheels 30. Formed on the circumference of the eccentric portions are guide tracks for cylinders 12, which serve as bearing, members for the wheels 30. The input shaft 10 is connected by means of a spring 5 to the motor shaft 9 of a drive motor 8. The motor is connected with a wheel 40 with internal toothing 41 by means of a member 6 and screws 7. The wheels 30 are located in the center between the circular flanges 50, which are interconnected by connecting members 60. The connecting members 60 pass without contact through the openings 32 in wheels 30, so that the flanges 50 may be securely connected together. The flange pair 50 is rotatably mounted with respect to the wheel 40 with internal toothing 41. The wheel 40 meshes with the external toothing of the wheels 30. The axes 30a of the wheels 30 are located parallel to the axis 40a of the wheel 40, yet offset about a degree of eccentricity e. The flanges 50 are provided with guide surface/tracks 54a, 54b, which define a linear guidance system 50b. The guidance system 50b is aligned transversely to the axis of the flange 50. Each wheel 30 is provided with guide tracks 34a, 34b, which define a linear guidance system 30b, this linear guidance system being aligned transversely to the axis 30a of the wheel 30. Located on both sides of the gear system between the flange 50 and the wheel 30 is a transforming member 70. The transforming member 70 has, in two directions oriented orthogonally to one another, tracks 74a, 74b or 75a, 75b, in such a way that these tracks are movably located in two directions extending perpendicularly to one another. One linear guidance system is formed on the flange 50, while the member 70 is movably located in the other direction in the guide 30b on wheel 30. Both flanges 50 and the member 70 have central openings 51 or 71. The input shaft 10 is mounted at both its ends in the central openings 51 of the flanges 50, in bearings 3. The input shaft 10 passes without contact through the opening 71 in members 70. The guide surfaces 54a and 54b with which each flange 50 is provided, are formed on the sides facing one another of the stops 55a and 55b. The stops 55a and 55b are in the form of axially symmetrical pairs and are located on the end face of the flange. The guide tracks 54a and 54b are formed directly on the stops 55a and 55b of the flange 50 (FIG. 1b). They may also be in the form of flat strips 81, which may be secured to the sides facing one another of the stops 55a, 55b (FIG. 1c, FIG. 2c). Axial openings/bores 53a, 53b pass through the stops 55a, 55b of the flanges 50. The guide tracks 34a, 34b, with which each wheel 30 is provided, are formed on the sides facing one another of the stops 35a and 35b. They are formed by pairs facing one another centrally, which are present on the end face of the wheel 30. The axial openings 32 in the wheel 30 are located in a circle between stop pairs 35a, 35b. The guide tracks 34a, 34b are formed directly on the stops 35a, 35b of the wheel 30 (FIG. 1). They may also however be in the form of flat strips 91, which are formed in a secured manner on the sides facing one another of the stops 35a, 35b (FIG. 1e, FIG. 2c).

The member 70 is provided with four legs/arms 74, carried by a circular portion 73. One pair of arms 74, facing one another, has guide tracks, by means of which the member 70 is movably located in the linear guide system 50b of the flange 50. The second pair of arms 74 facing one another likewise have parallel guide tracks, by means of which the member 70 is movably located in the linear guide system 30b of the wheel 30. Between the guide surfaces 54a and 54b of the linear guide system of the flange 50 and the guide tracks of the member 70 by means of which the member 70 is movably located in the linear guide system 50b, there are located cylindrical rolling members 80. The same also applies in the guide tracks 34a and 34b of the linear guide system 30b on wheel 30 and on the tracks of the member 70, in which the member 70 is movably located. In both cases guidance of the member 70 by means of roller bearings is ensured, when it executes relative oscillatory movements with respect to the wheel and with respect to the flange 50 and the axis 40a. The portion 62 of the connecting member 60 which connects the flanges 50, passes through the axial openings 53a and 53b formed in the stops 55a, 55b. The portion 62 is axially longer than the thickness of the wheel 30 from which it projects. The offset portion (collar) 61 of the connecting members 60 passes freely through the axial openings 32 in the wheel 30. The internal toothing 41 of the wheel 40 comprises cylinders 41b which are mounted in axial grooves 41a. The axial grooves 41a are uniformly distributed on the internal circumference of the wheel 40. Therefore there are involved gear wheels whose teeth preferably consist of cylinders. The same also applies to the external toothing 33 of the wheel 30, which comprises members 33b with a circular cross-section. The members 33b are mounted in axial grooves 33a. The axial grooves 33a are uniformly distributed on the external circumference of the wheel 30. Formed on the external circumference of the wheel 50 and on the internal circumference of the wheel 40 are radial rotating tracks, upon which the cylinders 47 are mounted. The end faces of the flanges 50 facing the members 70 are provided with axial bearing tracks, upon which are located the members 46 (cylinders made of steel or other hard materials). The members 46 are located in an axial bearing cage. The desired initial tension of the bearings in the axial direction can be achieved by axial spacer rings 44. Together with the connecting members 60, the nuts 63 securely interconnect the flanges. In this case the end faces of the stops 55a and 55b are in a pressure relationship with the end faces of the collar 61 of the connecting members 60. The collar 61 of the connecting member 60 thus fulfills the function of a spacer member. The spacer rings 44 secure the cylinders 41 and 33 against axial displacement.

FIGS. 2, 2a, 2b, 2c, 2d, 2e and 1e show a further embodiment of the gear system. Compared to the first embodiment, the difference resides in the type of connection of the flanges 50. Located on the stops 55a and 55b of flange 50 are spacer members 52. These spacer members 52 pass with a degree of play through axial openings 32 in the wheel 30, being provided with axial openings 56. The connecting members 60 pass through the openings 56. By means of tightening the screw nuts 63, the end faces of the spacer element 52 define the position of the two flanges.

FIG. 2e shows an exploded view of the gear system according to FIG. 2.

A further embodiment of the gear system with a cross-reduction mechanism is shown in FIGS. 3 and 3a. The reduction mechanism of the gear system is the same as in the preceding examples. The difference resides in the type of drive of the input shaft 10. Connected to the input shaft 10 is an entrainment means 15 with axial pins 16. The axial pins 16 are located uniformly on a circle and upon the end face of the entrainment means 15. Rotatably mounted on the pins are satellite gear wheels 2 with external toothing 21. The gear wheels 2 simultaneously mesh with the internal toothing 57 of the flange 150 and with the external toothing 11 of the input pinion 1.

A fourth embodiment of the gear system with a cross-reduction mechanism is shown in FIG. 4. The difference from the preceding gear systems resides in the type of bearing of the flanges 50 relative to the wheel 40. In this embodiment there is connected to the wheel 40 with the internal toothing 41 a member 43. In this member 43 there is rotatably mounted a driven unit 20, which is securely connected to the flange 50.

Finally, FIG. 5 shows a gear system in which the input shaft 10 is provided with an eccentric portion 17. Mounted on this eccentric portion 17 is a wheel 30 with a central opening 31. The wheel 30 has an external toothing 33. The circumference of the eccentric portion 17 forms running tracks for cylinder members which serve as bearings for the wheel 30. In wheel 40, the internal toothing 41 is in engagement with the external toothing 33 of wheel 30. The flange 50 is provided on the output side with guide tracks 54a and 54b which define a linear guidance in a direction transversely to the axis of rotation of the flange 15. Simultaneously, wheel 30 is provided with guide tracks 34a and 34b, which define a linear guidance system. This guidance is oriented transversely to the axis 30a of the wheel 30. Between the flange 50, which is provided with guide tracks 54a, 54b, and the wheel 30, which is provided with guide tracks 34a and 34b, there is located a transforming member 70. The member 70 has, in two directions extending at right angles to one another, guide tracks 74a, 74b or 75a and 75b, in such a way that it is movably located in two directions extending orthogonally to one another, and can oscillate, in the one hand, in a linear guidance of flange 50, and on the other hand in a linear guidance of wheel 30. Located between the guide tracks of the flange 54a and 54b and of the transforming member 34a and 34b are cylinders 80 and 90, which ensure displacement of the transforming member during its relative movements with respect to the wheel 30 and the flange 50. The flange 50 and the transforming member 70 have central openings 51 and 71, the input shaft 10 being mounted at one end in the central opening 51 of the flange 50 via a bearing; simultaneously it is passed with a degree of play through the central opening 71 in member 70. The other end of the input shaft 10 is mounted in the wheel 40. Attached to the wheel 40 is a member 43 in which there is rotatably mounted a driven unit 20, which is securely connected to the flange 50.

Other possible solutions include mutually-interconnected lateral flanges, between which there is located a wheel 30. The type of connection of the flanges would in this case be analogous to the embodiments described above, the left-hand flange moving together with the output flange 50.

LIST OF REFERENCE NUMERALS

1 Input pinion
2 Satellite gear wheel
3 Bearing of the input shaft 10 in the flange of the gear system
4 Axial opening of the input shaft of the gear system
5 Spring of the motor shaft
6 Connecting member of the motor and of the gear system
7 Connecting nut
8 Drive motor
9 Motor shaft
10 Input shaft
11 External toothing of the input pinion
12 Cylinder rollers of the rotary bearing on crank pins of the input shaft
15 Entrainment means of the input shaft
16 Pins of the input shaft
17 Portion (eccentric)
20 Drive unit/member
21 External toothing of the satellite gear wheels
30 Wheel with external toothing
30a Axis of 30
30b Guidance of 30
31 Central opening of wheel
32 Opening of wheel
33 External toothing of wheel
33a Axial grooves on external circumference of wheel
33b Elongate elements with circular cross-section, forming the toothing of the wheel
34a
34b Guide tracks
35a
35b Stops (noses) formed in pairs opposite one another centrally on the end face of the wheel
40 Wheel with internal toothing
40a Axis of 40
41 Internal toothing of wheel 40
41a Axial grooves formed on internal circumference of the casing
41b Elongate element with circular cross-section forming the internal toothing of the casing
42a Bearing of the flange in the casing
43 Bearing (secured) on the casing
44 Spacer ring
45 Bearing cage (axial)
46 Roller member (axial)
47 Roller member (radial)
50 Output member (flange)
50b Guide on 50
501 Central opening of the output member
52 Spacer member
53a
53b Axial openings passed through the stop means and formed in the flange
54a
54b Guide surfaces/tracks, formed on the flange
55a
55b Stops formed as pairs facing one another centrally and located on the end face of the flange
56 Axial openings in the spacer members
57 Internal toothing formed on the flange
58 Contrate gear with internal toothing
61 Occupied portion of the transverse member
62 Flush portion of the transverse member
63 Screw nut for securing the transverse members
70 Member (cross)
71 Opening (center of the cross)
73 Circular portion of the cross
74 Leg of the cross
74a
74b Track (guidance) of the cross in first direction
75a
75b Track (guidance) of the cross perpendicular to the track in first direction
80 Roller members (elements) between the guide tracks of the output member and the wheel
81 Strips connected to the stops of the flange on which the guide tracks of the roller members are formed
82 Sliding strips secured to the stops of the flange
90 Roller members between guide tracks of the cross and the wheel
91 Strips secured to lateral stops on which the guide tracks of the roller members are formed
92 Sliding strips secured to the stops of the wheel e Eccentricity of the crank pin.

I claim:

1. Gear system comprising
    at least one internally geared wheel (40) having internal toothing (41);
    at least one output member (50) rotatably mounted relative to the internally geared wheel (40);
    an input shaft (10) having at least one eccentric portion (17);
    at least one externally geared wheel (30) having external toothing (33) and meshing with the internal toothing (41) of the internally geared wheel (40) and rotatably attached to the eccentric portion (17) of the input shaft (10); and
    a planar member (70) having arms (74) and located between the wheel (30) and the output member (50) for transforming a planetary movement of the wheel (30) into a rotary movement of the output member (50), said planar member (70) with the arms (74) being mounted to be displaced with respect to the wheel (30) and the output member (50) wherein the planar member (70) with the arms (74) executes transverse movements with respect to an axis of the input shaft (10).

2. Gear system according to claim 1, wherein the axis of the shaft (10) and the axes of the eccentric portions (17) extend parallel to one another.

3. Gear system comprising
    at least one internally geared wheel (40) having internal toothing (41);
    at least two output members (50) rotatably mounted relative to the internally geared wheel (40) and non-rotatably interconnected;
    an input shaft (10) having at least one eccentric portion (17);

at least two externally geared wheels (30) having external toothing (33) and meshing with the internal toothing (41) and located between the output members (50) and rotatably attached to the eccentric portion (17) of the input shaft (10); and members (70) located between each of the wheels (30) and each of the output members (50) for transforming a planetary movement of the wheels (30) into a rotary movement of the output members (50), said members (70) being mounted to be displaced with respect to the wheels (30) and the output members (50) wherein the members (70) execute transverse movements with respect to an axis of the input shaft (10).

4. Gear system according to claim 3, wherein the output members (50) are interconnected by connecting means (60).

5. Gear system according to claim 1, wherein the wheels (30) have openings (32) for the connecting means (60).

6. Gear system according to claim 4, wherein the connecting means (60) pass through the wheels (30) without contact.

7. Gear system according to claim 4, wherein the connecting means (60) are in the form of screws which extend parallel to the axis (40a) of the wheel (40).

8. Gear system according to claim 1, wherein the wheel (30) and the output member (50) have guide systems (30b, 50b) for the planar member (70) with the arms (74).

9. Gear system according to claim 8, wherein the guide systems (30b, 50b) have linear guide tracks (34a, 34b; 54a, 54b).

10. Gear system according to claim 1, wherein the planar member (70) with the arms (74) is linearly guided with respect to the output member (50) and to the wheel (30).

11. Gear system comprising at least one internally geared wheel (40) having internal toothing (41);

at least one output member (50) rotatably mounted relative to the internally geared wheel (40);

an input shaft (10) having at least one eccentric portion (17);

at least one wheel (30) having external toothing (33) and meshing with the internal toothing (41) of the internally geared wheel (40) and rotatably attached to the eccentric portion (17) of the input shaft (10);

a member (70) located between the wheel (30) and the output member (50) for transforming a planetary movement of the wheel (30) into a rotary movement of the output member (50), said member (70) being mounted to be displaced with respect to the wheel (30) and the output member (50) wherein the member (70) executes transverse movements relative to an axis of the input shaft (10), and wherein the member (70) has first arms (75) cooperating with the output member (50) and second arms (74) cooperating with the wheel (30).

12. Gear system according to claim 1, wherein the member (70) is in the form of a cross with arms (74) aligned at right angles to one another.

13. Gear system according to claim 12, wherein two arms (74) extending parallel to one another are guided by the output member (50) while the other two arms extending parallel to one another are guided by the wheel (30).

14. Gear system according to claim 9, wherein the planar member (70) with the arms (74) has a guided track (74a, 74b; 75a, 75b).

15. Gear system comprising at least one internally geared wheel (40) having internal toothing (41);

at least one output member (50) rotatably mounted relative to the internally geared wheel (40);

an input shaft (10) having at least one eccentric portion (17);

at least one wheel (30) having external toothing (33) and meshing with the internal toothing (41) of the internally geared wheel (40) and rotatably attached to the eccentric portion (17) of the input shaft (10);

a member (70) located between the wheel (30) and the output member (50) for transforming a planetary movement of the wheel (30) into a rotary movement of the output member (50), said member (70) being mounted to be displaced with respect to the wheel (30) and the output member (50), and wherein the member (70) executes transverse movements relative to an axis of the input shaft (10);

wherein the wheel (30) and the output member (50) have guide systems (30b, 50b) for the member (70);

wherein the guide systems (30b, 50b) have linear guide tracks (34a, 34b; 54a, 54b);

wherein the member (70) has a guided track (74a, 74b; 75a, 75b);

and wherein roller members (80, 90) are located between the guide tracks (34a, 34b; 54a, 54b) associated with one another and the tracks (74a, 74b; 75a, 75b).

16. Gear system according to claim 15, wherein the roller members (80, 90) have a circular cross-section.

17. Gear system according to claim 3, wherein the output members (50) have spacer members (52).

18. Gear system according to claim 3, wherein the output members (50) have spacer members (52) and wherein the spacer members (52) extend in the axial direction of the input shaft (10) and are of such dimensions that each of the members (70) is located without pressure between the wheel (30) and one of the output members (50).

19. Gear system according to claim 17, wherein the spacer members (52) pass without contact through the openings (32) in a form-and/or power-locking fashion.

20. Gear system according to claim 17, wherein the connecting means (60) pass through the spacer members (52) and the openings (32).

21. Gear system according to claim 1, wherein the planar member (70) with the arms (74) has a continuous opening (71) through which the input shaft (10) passes.

22. Gear system according to claim 1, wherein at least one of the internal toothing (41) of the internally geared wheel (40) and the external toothing (33) of the externally geared wheel (30) is formed from rotatably mounted elements with a circular cross-section.

23. Gear system according to claim 1, wherein the output member (50) is in the form of flange mounted rotatably relative to the internally geared wheel (40).

24. Gear system according to claim 1, wherein the output member (50) and the internally geared wheel (40) have a common axis of rotation.

25. Gear system according to claim 1, wherein the internal geared wheel (40) is in the form of a casing.

26. Gear system comprising at least one internally geared wheel (40) having internal toothing (41);

at least two output members (50) rotatably mounted relative to the internally geared wheel (40);

an input shaft (10) having at least one eccentric portion (17);

at least one wheel (30) having external toothing (33) and meshing with the internal toothing (41) and located between the output members (50) and rotatable attached to the eccentric portion (17) of the input shaft (10);

a planar member (70) located between the wheel (30) and each of the output members (50) for transforming a planetary movement of the wheel (30) into a rotary movement of the output members (50), said planar member (70) being mounted to be displaced with respect to the wheel (30) and the output member (50), and wherein the planar member (70) executes a transverse movement with respect to an axis of the input shaft (10), wherein the output members (50), forming a pair, are non-rotatably interconnected and are rotatable mounted in the internally geared wheel (40), and in that the internally geared wheel (40) is securely connected to a member (43) in which is mounted a driven unit (20) connectable to the output members (50).

27. Gear system comprising at least one internally geared wheel (40) having internal toothing (41);

at least one output member (50) rotatably mounted relative to the internally geared wheel (40);

an internally geared output member (150) having an internal toothing (57) and rotatable mounted relative to the internally geared wheel (40) and non-rotatably interconnected to the output member (50);

an input shaft (10) having at least one eccentric portion (17);

at least two wheels (30) having external toothing (33) and meshing with the internal toothing (41) of the internally geared wheel (40) and located between the output member (50) and the internally geared output member (150), respectively, and rotatably attached to the eccentric portion (17) of the input shaft (10);

members (70) located between each of the wheels (30) and the output member (50) and the internally geared output member (150), respectively, for transforming a planetary movement of the wheels (30) into a rotary movement of the output member (50) and the internally geared output member (150), said members (70) being mounted to be displaced with respect to the wheels (30) and the output member (50) and the internally geared output member (150), wherein said members (70) execute transverse movements relative to an axis of the input shaft (10), wherein the input shaft (10) is connected to an entrainment means (15) with axial pins (16) which are uniformly distributed on an end face of the entrainment means (15) in a circular configuration, and upon which are located rotatably mounted satellite gear wheels (2) with external toothing (21) which mesh with the internal toothing (57) of the internally geared output member (150) and simultaneously with an external toothing (11) of an input pinion (1).

28. Gear system comprising at least one internally geared wheel (40) having internal toothing (41);

at least one output member (50) rotatably mounted relative to the internally geared wheel (40);

an input shaft (10) having at least one eccentric portion (17);

at least one wheel (30) having external toothing (33) and meshing with the internal toothing (41) of the internally geared wheel (40) and rotatably attached to the eccentric portion (17) of the input shaft (10);

a flat member (70) with radial arms (74) and located between the wheel (30) and the output member (50) for transforming a planetary movement of the wheel (30) into a rotary movement of the output member (50), said flat member (70) with the radial arms (74) being mounted to be displaced with respect to the wheel (30) and the output member (50), wherein the flat member (70) with the radial arms (74) executes transverse movements relative to an axis of the input shaft (10), wherein the output member (50) is mounted to rotate with respect to the internally geared wheel (40), wherein the internally geared wheel (40) is securely connected to a member (43), and wherein a driven unit is rotatably mounted in the member (43) which driven unit is securely connected to the output member (50).

29. Gear system according to claim 1, wherein the input shaft (10) is rotatable mounted at one end in the output member (50), and at the other end in the internally geared wheel (40).

30. Gear system comprising at least one internally geared wheel (40) having internal toothing (41);

at least one output member (50) rotatable mounted relative to the internally geared wheel (40);

an input shaft (10) having at least one eccentric portion (17);

one wheel (30) having external toothing (33) and meshing with the internal toothing (41) of the internally geared wheel (40) and rotatably attached to the eccentric portion (17) of the input shaft (10);

a flat member (70) located between the wheel (30) and the output member (50) for transforming a planetary movement of the wheel (30) into a rotary movement of the output member (50), said flat member (70) being mounted to be displaced with respect to the wheel (30) and the output member (50), wherein said flat member (70) executes transverse movements relative to an axis of the input shaft (10), wherein the input shaft (10) is connected to an entrainment means (15) with axial pins (16) which are uniformly distributed on an end face of the entrainment means (15) in a circular configuration, and upon which are located rotatably mounted satellite gear wheels (2) with external toothing (21) which mesh with an external toothing (11) of an input pinion (1).

* * * * *